(12) United States Patent
Ueki

(10) Patent No.: US 12,509,921 B2
(45) Date of Patent: Dec. 30, 2025

(54) VEHICLE LID LOCK DEVICE

(71) Applicant: SUBARU CORPORATION, Tokyo (JP)

(72) Inventor: Toshiyuki Ueki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 158 days.

(21) Appl. No.: 18/386,332

(22) Filed: Nov. 2, 2023

(65) Prior Publication Data

US 2024/0191547 A1  Jun. 13, 2024

(30) Foreign Application Priority Data

Dec. 9, 2022  (JP) .................................. 2022-197314

(51) Int. Cl.
*E05B 79/20* (2014.01)
*E05B 81/16* (2014.01)
*E05B 85/16* (2014.01)
E05B 83/34 (2014.01)

(52) U.S. Cl.
CPC .............. *E05B 79/20* (2013.01); *E05B 81/16* (2013.01); *E05B 85/16* (2013.01); *E05B 83/34* (2013.01)

(58) Field of Classification Search
CPC .......... E05B 79/20; E05B 81/01; E05B 85/16; E05B 83/34
See application file for complete search history.

(56) References Cited

U.S. PATENT DOCUMENTS

| | | | | |
|---|---|---|---|---|
| 5,664,811 A | * | 9/1997 | Martus | B60K 15/05 292/144 |
| 2011/0241360 A1 | | 10/2011 | Kitamura | |
| 2018/0142505 A1 | * | 5/2018 | Takazawa | E05B 83/34 |

FOREIGN PATENT DOCUMENTS

| | | | | |
|---|---|---|---|---|
| JP | 5-7872 U | | 2/1993 | |
| JP | 2011-214242 A | | 10/2011 | |
| JP | 2013-113059 A | | 6/2013 | |
| JP | 2013113059 | * | 6/2013 | ............. E05B 47/00 |

* cited by examiner

*Primary Examiner* — Kristina R Fulton
*Assistant Examiner* — Thomas L Neubauer
(74) *Attorney, Agent, or Firm* — TROUTMAN PEPPER LOCKE LLP

(57) ABSTRACT

A vehicle lid lock device includes: a drive actuator; a lock pin movable between a first position where one end thereof is engaged with a part of a lid in a vehicle exterior panel to maintain the lid closed and a second position where the lock pin is disengaged from the part of the lid to allow the lid to open; a handle member to be gripped by a user; and a cable having one end coupled to another end of the lock pin and another end coupled to a part of the handle member and configured to retract the lock pin to disengage the lock pin from the part of the lid member when the user pulls the handle member. A clip part is formed integrally with the handle member. The handle member is tiltable with respect to a fixing surface of the vehicle interior structure.

9 Claims, 3 Drawing Sheets

VEHICLE LID LOCK DEVICE

CROSS-REFERENCE TO RELATED APPLICATION

The present application claims priority from Japanese Patent Application No. 2022-197314 filed on Dec. 9, 2022, the entire contents of which are hereby incorporated by reference.

BACKGROUND

The disclosure relates to vehicle lid lock devices applied to vehicles, such as automobiles, and more particularly to vehicle lid lock devices including a lid unlocking mechanism for manually unlocking a lid in an emergency.

Conventional vehicles, such as automobiles, have a lid that opens and closes an opening through which an internal space, in which a fuel supply port (fuel filler), a power feed inlet with which a charging cable is coupled, or the like is provided, can be exposed to the outside. The vehicles of this type also have a lid lock device that maintains the lid closed at times other than the time of supplying fuel or power, and that eliminates the closed state of the lid and allows the lid to be opened at the time of supplying fuel or power.

The conventional vehicle lid lock devices move a rod-like member (lock pin) such that the lock pin is engaged with or disengaged from the lid by using a drive source, such as a drive actuator, to maintain the lid closed or to eliminate the closed state of the lid and allow the lid to be opened.

Some of such vehicle lid lock devices include an emergency lid unlocking mechanism that allows a user to manually eliminate the closed state of the lid closed by the lock pin in an emergency, such as when the drive source, such as the drive actuator, cannot move the lock pin.

Japanese Unexamined Patent Application Publication (JP-A) No. 2011-214242 and the like have made various proposals about vehicle lid lock devices having the emergency lid unlocking mechanism of this type.

JP-A No. 2011-214242 and the like disclose a vehicle lid lock device in which one end of a cable is coupled to the rear end of the lock pin, and the other end of the cable is coupled to a handle member. The handle member is detachably disposed in a fitting hole in a vehicle body. In an emergency, a user detaches the handle member fixed to the vehicle body and pulls the handle member in a predetermined direction to eliminate the closed state of the lid closed by the lock pin.

In the structure disclosed in JP-A No. 2011-214242 and the like, the user performs multiple complicated operations, such as detaching the handle member fixed to the vehicle body and pulling the detached handle member, in an emergency.

Meanwhile, the emergency lid unlocking mechanism is not used frequently because the mechanism is used in an emergency or the like. Thus, the components, such as the handle member, constituting the emergency lid unlocking mechanism of the conventional vehicle lid lock device are usually disposed in a narrow, inconspicuous space inside the vehicle body.

Hence, the operability at the time of detaching the handle member may not necessarily be good depending on the position of the handle member or the like. For example, the structure disclosed in JP-A No. 2011-214242 has a problem in that the user may drop the handle member inside the vehicle body due to an operation error or the like when detaching the handle member fixed to the vehicle body in an emergency.

JP-A No. 2013-113059, Japanese Unexamined Utility Model (Registration) Application Publication (JP-UM-A) No. H5-7872, and the like disclose proposals for solving these problems.

In the emergency lid unlocking mechanisms of the vehicle lid lock devices disclosed in JP-A 2013-113059 and JP-UM-A No. H5-7872, the closed state of the lid is eliminated by pulling the handle member fixed to the vehicle body in a predetermined direction without detaching the handle member from the vehicle body in an emergency.

For example, in the vehicle lid lock device disclosed in JP-A No. 2013-113059 and the like, the handle member is slidable in a predetermined direction (cable pulling direction) with respect to a support member fixed to the vehicle body.

In the vehicle lid lock device disclosed in JP-UM-A No. H5-7872 and the like, the other end of the cable is passed through and supported by a support member fixed to the vehicle body, and the closed state of the lid is eliminated by pulling the other end of the cable.

SUMMARY

An aspect of the disclosure provides a vehicle lid lock device. The vehicle lid lock device includes a drive actuator, a lock pin, a handle member, and a cable. The lock pin is provided so as to be movable between a first position where one end of the lock pin is engaged with a part of a lid provided in a vehicle exterior panel to maintain a closed state of the lid and a second position where the lock pin that has received a driving force from the drive actuator and retracted in an axial direction is disengaged from the part of the lid to allow the lid to be in an open state. The handle member is to be gripped by a user. The cable has one end coupled to another end of the lock pin and another end coupled to a part of the handle member and is configured to retract the lock pin in the axial direction to disengage the lock pin from the part of the lid member when the user pulls the handle member. A clip part via which the handle member is fixed to a vehicle interior structure is formed integrally with the handle member. The handle member is tiltable with respect to a fixing surface of the vehicle interior structure when the handle member is fixed to the vehicle interior structure via the clip part.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
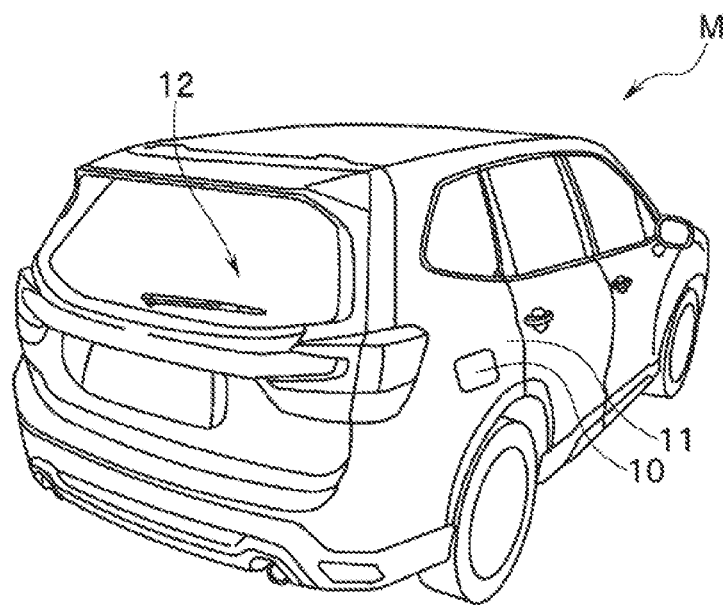
FIG. 1 is an external perspective view schematically illustrating the exterior of a vehicle having a vehicle lid lock device according to an embodiment of the disclosure.

Because the structures disclosed in JP-A No. 2013-113059, JP-UM-A No. H5-7872, and the like use multiple components, such as the handle member and the support member for fixing the handle member to the vehicle body, the structure of the mechanism is complex and the manufacturing cost is high.

It is desirable to provide a vehicle lid lock device having an emergency lid unlocking mechanism that has good operability and enables reliable operation with a small number of components and a simple structure, and that can contribute to cost reduction.

The disclosure will be described according to the embodiments illustrated in the drawings. The drawings used in the following description are schematic illustrations, and the dimensional relationships, the scales, and the like of members may differ among the components so that components are illustrated in recognizable sizes in the drawings. Therefore, the number, shape, size ratio, relative positional relationship, and the like of the components are not limited to those in the illustrated embodiments.

Figure 2:
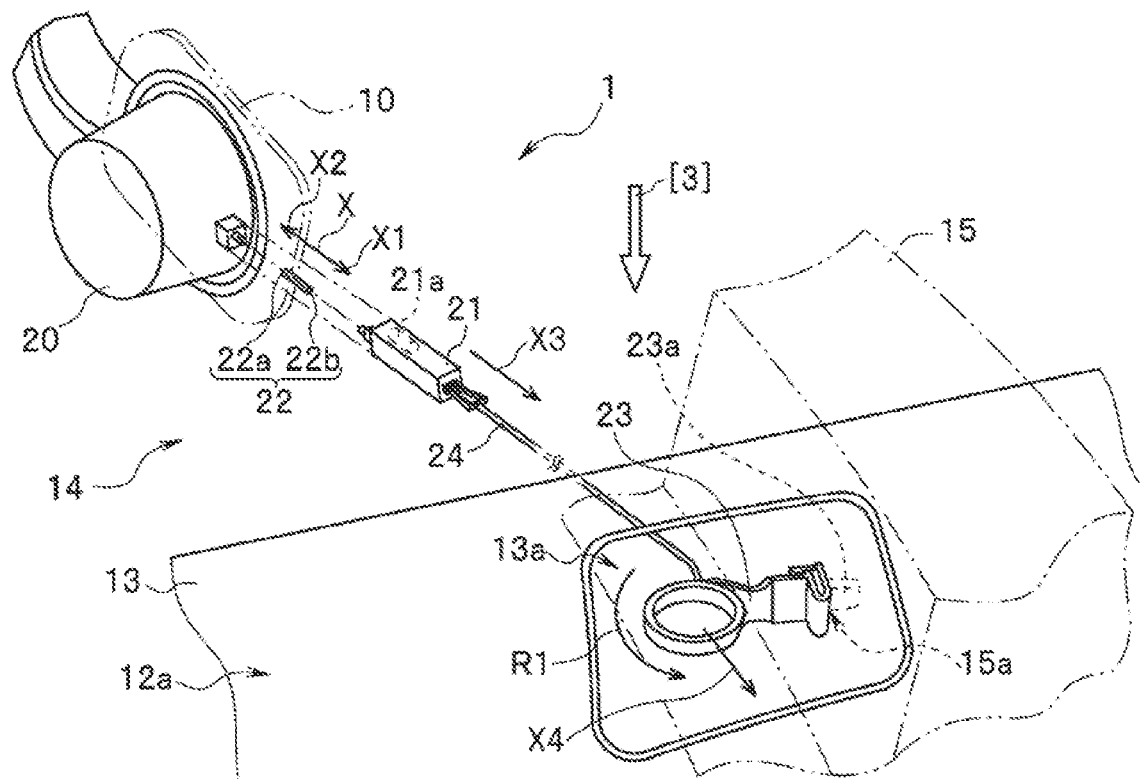
FIG. 2 is a conceptual diagram illustrating the structure of the vehicle lid lock device according to the embodiment of the disclosure.
Figure 3:
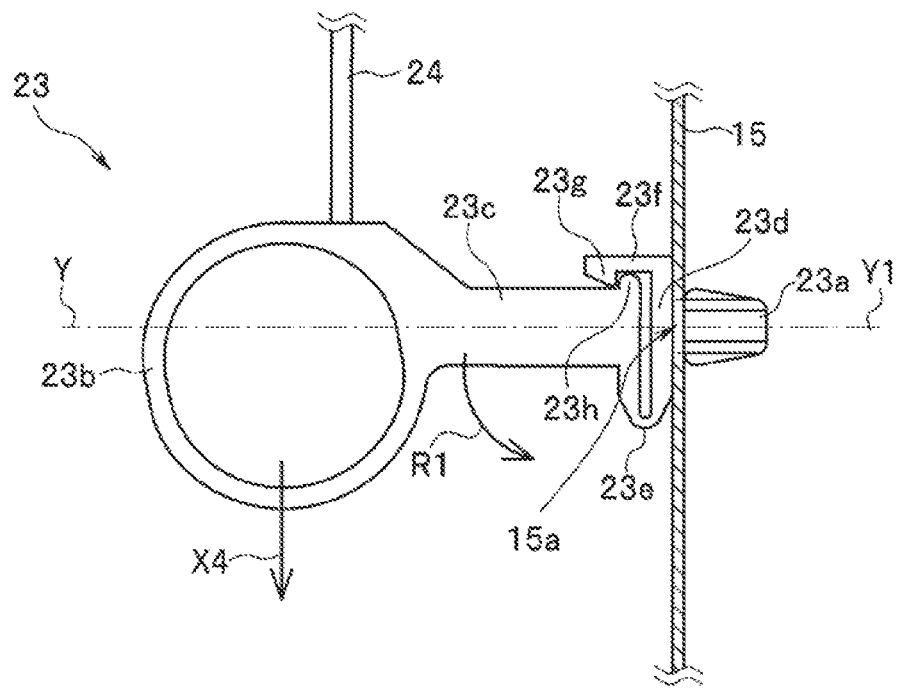
FIG. 3 schematically illustrates the structure and operation of an emergency lid unlocking mechanism included in the vehicle lid lock device illustrated in FIG. 2.
Figure 4:
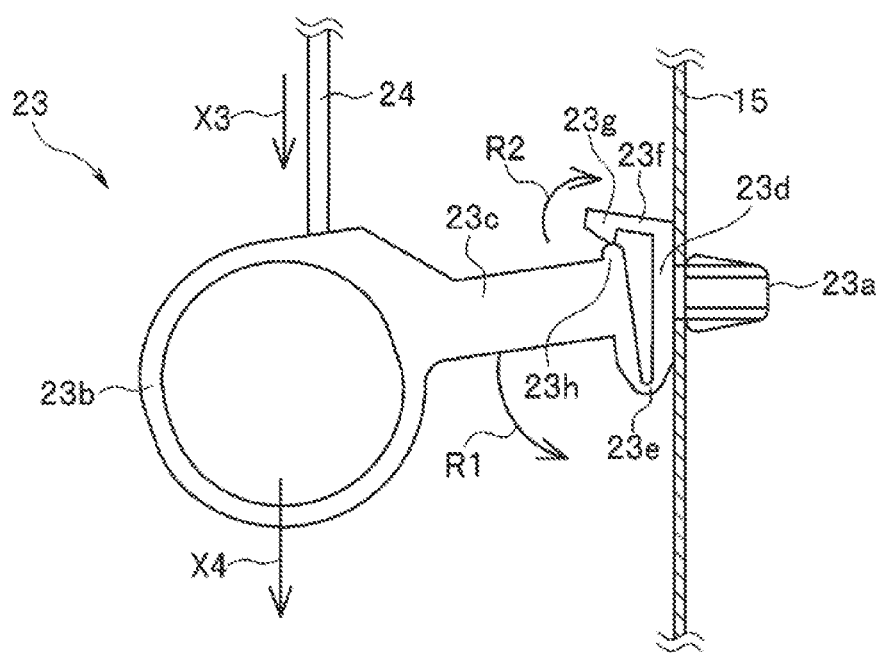
FIG. 4 illustrates the operation after the state in FIG. 3.
Figure 5:
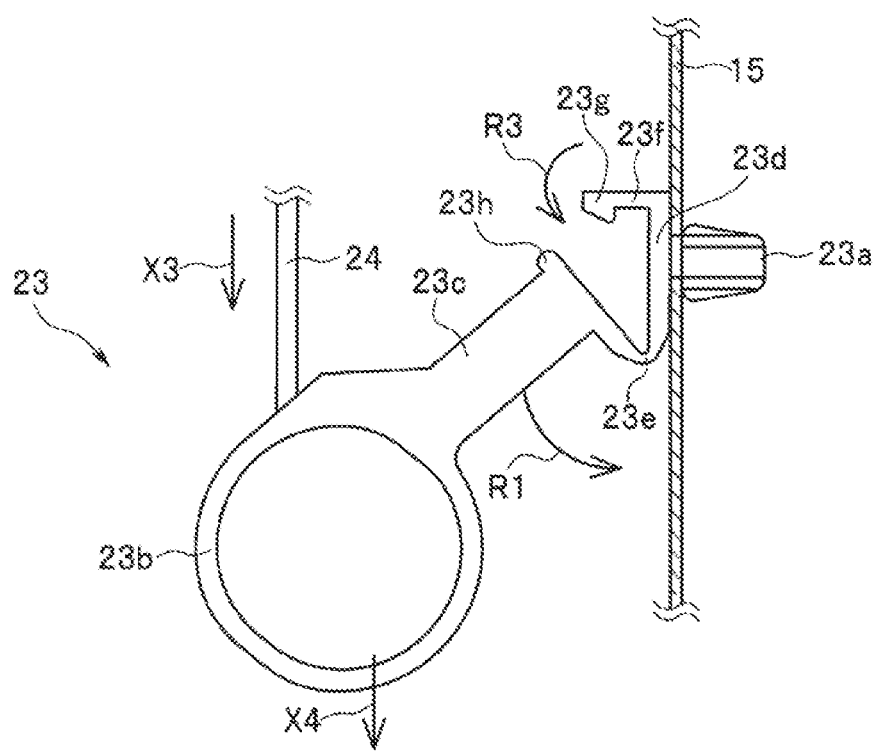
FIG. 5 illustrates the operation after the state in FIG. 4.

FIG. 1 is an external perspective view schematically illustrating the exterior of a vehicle having a vehicle lid lock device according to an embodiment of the disclosure. FIG. 2 is a conceptual diagram illustrating the structure of the vehicle lid lock device according to the embodiment of the disclosure. FIGS. 3 to 5 are schematic views illustrating the structure and operations of an emergency lid unlocking mechanism included in the vehicle lid lock device illustrated in FIG. 2. FIGS. 3 to 5 illustrate states viewed from the direction of arrow [3] in FIG. 2. FIGS. 3 to 5 illustrate only a handle member and a cable among the component members constituting the emergency lid unlocking mechanism.

FIG. 1 illustrates a vehicle M having a vehicle lid lock device 1 (not illustrated in FIG. 1; see FIG. 2) according to the embodiment of the disclosure. The vehicle M has a lid 10 at a predetermined position in, for example, a vehicle exterior panel 11 at a rear side surface. The lid 10 opens and closes an opening, through which an internal space provided with a fuel supply port, a power supply inlet for coupling a charging cable, or the like can be exposed to the outside. The vehicle M has a luggage room 12 in the rear section.

The vehicle lid lock device 1 (see FIG. 2) according to this embodiment is provided inside the vehicle M, near the lid 10 and the luggage room 12. In FIG. 2, a partition 13 dividing an interior space 12a of the luggage room 12 and a vehicle interior space 14 is conceptually illustrated. That is, FIG. 2 illustrates that the vehicle lid lock device 1 according to this embodiment is disposed in the vehicle interior space 14, which is on the opposite side of the partition 13 from the luggage room 12.

FIG. 2 illustrates a structural unit 20 including a fuel supply port or a power supply inlet. The structural unit 20 will be referred to as a supply port unit 20 in the following description.

The lid 10 is attached to the opening in the vehicle exterior panel 11 (not illustrated in FIG. 2; see FIG. 1) at a position facing the supply port unit 20 in a manner capable of being opened and closed via, for example, a hinge.

The basic structures of the supply port unit 20, the lid 10, and the like are substantially the same as those used in the conventional vehicle lid lock devices. Hence, the detailed description and illustration of these component members, which use a known technology, will be omitted.

As illustrated in FIG. 2, the vehicle lid lock device 1 according to this embodiment includes a body 21 including a drive actuator 21a, a lock pin 22, and an emergency lid unlocking mechanism.

The drive actuator 21a is a drive source including an electric motor and provided in a housing of the body 21. Besides the drive actuator 21a, the body 21 accommodates a driving-force transmission mechanism (not illustrated) for transmitting the driving force from the drive actuator 21a to the lock pin 22. The driving force from the drive actuator 21a moves the lock pin 22 in the axial direction. The arrow X direction in FIG. 2 is the axial direction of the lock pin 22. The lock pin 22 retracts in the arrow X1 direction in FIG. 2. The lock pin 22 projects in the arrow X2 direction in FIG. 2.

When the lock pin 22 has moved in the arrow X2 direction in FIG. 2, one end of the lock pin 22 engages with a part of the lid 10 to maintain the lid 10 closed. When the lock pin 22 has moved in the arrow X1 direction in FIG. 2, the lock pin 22 is disengaged from the part of the lid 10 to allow the lid 10 to be opened.

The lock pin 22 is a hard rod-like member. The lock pin 22 is supported so as to be able to protrude from and retract into the body 21 in the axial direction X. Normally, one end 22a of the lock pin 22 engages with a part of the lid 10 through the supply port unit 20 to maintain the lid 10 closed. The position of the lock pin 22 at this time is referred to as a first position. When the lock pin 22 is at the first position, the lid 10 is fixed in the closed state and is prevented from being displaced to the open state.

When the drive actuator 21a is driven upon receiving a predetermined operation, the driving force from the drive actuator 21a acts on the lock pin 22 through the predetermined driving-force transmission mechanism (not illustrated). Examples of the predetermined operation in this case include a lid releasing operation and a door unlocking operation.

The lock pin 22, upon receiving the driving force from the drive actuator 21a, moves in the retracting direction X1 of the axial direction X. As a result, the lock pin 22 is disengaged from the part of the lid 10. This allows the lid 10 to be displaced to the open state. The position of the lock pin 22 at this time is referred to as a second position. In this manner, the lock pin 22 is movable between the first position and the second position.

The structures of the lock pin 22 itself, the mechanism for moving the lock pin 22, and the like are substantially the same as those used in the conventional vehicle lid lock devices. Hence, detailed description and illustration of the structures will be omitted.

The emergency lid unlocking mechanism includes a handle member 23 and a cable 24.

The handle member 23 is an operation member to be gripped by a user and receive a predetermined manual operation in an emergency. Herein, "emergency" is a case where, for example, the drive actuator 21a cannot move (retract) the lock pin 22 due to some factors such as malfunction or power shortage.

For example, the handle member 23 is provided near an opening 13a formed in the partition 13 provided in the luggage room 12. Although not illustrated in FIG. 2, the opening 13a is provided with a removable lid. Normally, the opening 13a is covered by the lid. Hence, when the opening 13a is covered by the lid, the handle member 23 is hidden from the luggage room 12. When the emergency lid unlocking mechanism is to be used in an emergency or the like, the lid is removed, and then a predetermined operation is performed on the handle member 23.

Therefore, the handle member 23 is disposed at a position that can be easily reached by a user who has removed the lid in the partition 13 and extended his or her fingers or the like through the opening 13a.

As illustrated in FIG. 2, the handle member 23 is fixed to a wall of the vehicle interior structure 15 with a clip part 23a. The clip part 23a is formed integrally with the handle member 23.

In this case, the handle member 23 is fixed to the vehicle interior structure 15 by snap-fitting, in which the clip part 23a is fitted into a fitting hole 15a formed in the vehicle interior structure 15. The structure of the handle member 23 will be described in more detail below.

The cable 24 is a string-like member coupling the lock pin 22 and the handle member 23. One end of the cable 24 is coupled to the other end 22b of the lock pin 22 through the body 21. The other end of the cable 24 is coupled to a part of the handle member 23.

Now, the structure of the handle member 23 will be described in more detail. As illustrated in FIG. 3, besides the clip part 23a, the handle member 23 includes a grip part 23b, a support arm 23c, a planar part 23d, a hinge part 23e, a beam part 23f, a locking claw 23g, and a locking projection 23h. The handle member 23 is formed as a single component of, for example, a synthetic resin material.

The grip part 23b is an operation part to be gripped and operated by a user in an emergency, for example. In this embodiment, the grip part 23b has a substantially ring shape having such an inside diameter that a user can insert his or her finger or the like therethrough for operation. The other end of the cable 24 is coupled to a predetermined part of the outer circumferential surface of the grip part 23b.

The support arm 23c is a beam-like portion extending outward from a predetermined portion of the outer circumferential surface of the grip part 23b. The support arm 23c and the grip part 23b are formed integrally.

For example, the support arm 23c is provided at a position, in the grip part 23b, rotated by about 90° in the circumferential direction with respect to the portion in the grip part 23b with which the other end of the cable 24 is coupled (see FIG. 3, etc.). The portion of the support arm 23c connected with the grip part 23b is referred to as the proximal end. The portion of the support arm 23c located at the end of the portion extending from the proximal end is referred to as the distal end.

The locking projection 23h protruding outward from the outer surface of the support arm 23c in a direction substantially orthogonal to a direction parallel to the central axis (Y in FIG. 3) of the support arm 23c is provided at a portion of the distal-side periphery of the support arm 23c so as to be integral therewith. The locking projection 23h has, for example, a substantially semispherical end. The locking projection 23h is a portion to be engaged with and disengaged from the locking claw 23g described below.

Although the details will be described below, a state in which the locking projection 23h is locked by the locking claw 23g is referred to as the normal state of the handle member 23. When the handle member 23 is in the normal state, the support arm 23c is set in a substantially upright state with respect to the planar part 23d. At this time, the support arm 23c is fixed in a substantially upright state to a mounting surface or a fixing surface of the wall of the vehicle interior structure 15. At this time, the central axis Y of the support arm 23c coincides with the central axis Y1 of the planar part 23d and the clip part 23a.

The planar part 23d is a planar component member serving as a base part of the handle member 23. The clip part 23a projecting outward in a direction substantially orthogonal to a planar surface of the planar part 23d is provided integrally with the planar surface.

The planar surface of the planar part 23d where the clip part 23a is provided is referred to as a back surface of the planar part 23d. The back surface of the planar part 23d faces the outer surface of the wall of the vehicle interior structure 15 when the handle member 23 is fixed to the wall of the vehicle interior structure 15. The surface on the opposite side of the back surface of the planar part 23d is referred to as a front surface.

The planar part 23d is provided with, on the front surface thereof, the beam part 23f extending from a predetermined position in the periphery thereof in the direction opposite to the direction in which the clip part 23a projects. The beam part 23f is formed in an elastic cantilever shape. The beam part 23f is formed integrally with the planar part 23d.

The beam part 23f has the integrally formed locking claw 23f at the distal end thereof. The locking claw 23g has the shape of a hook that can be engaged with and disengaged from the locking projection 23h. The beam part 23f and the locking claw 23g are formed at a position facing the portion where the locking projection 23h is formed.

The hinge part 23e is a component member coupling a portion of the distal-side periphery of the support arm 23c and a portion of the periphery of the planar part 23d together. One end of the hinge part 23e is continuous with a portion in the distal-side periphery of the support arm 23c, on the opposite side of the central axis Y of the support arm 23c from the portion where the locking projection 23h is formed. The other end of the hinge part 23e is continuous with a portion in the periphery of the planar part 23d, on the opposite side of the central axis Y1 (see FIG. 3) of the planar part 23d from the portion where the beam part 23f is formed. In this case, the hinge part 23e is formed as a self-hinge structure, which is formed integrally with the support arm 23c and the planar part 23d.

The hinge part 23e allows the support arm 23c, including the grip part 23b, of the handle member 23 to tilt with respect to the outer surface (fixing surface) of the wall of the vehicle interior structure 15 when the handle member 23 is fixed to the vehicle interior structure 15 via the clip part 23a.

The positional relationship among the cable 24, the hinge part 23e, the beam part 23f, the locking claw 23g, and the locking projection 23h will be described again. The positional relationship will be described based on the case where the handle member 23 is in the normal state.

The hinge part 23e is disposed on the opposite side of the central axis Y from the side on which the cable 24 is disposed.

The beam part 23f, the locking claw 23g, and the locking projection 23h are disposed on the same side of the central axis Y. The beam part 23f and the locking claw 23g face the locking projection 23h in a direction perpendicular to the central axis Y.

The beam part 23f, the locking claw 23g, and the locking projection 23h are disposed on the same side as the cable 24 with respect to the central axis Y.

The hinge part 23e is disposed on the opposite side of the central axis Y from the beam part 23f, the locking claw 23g, and the locking projection 23h.

The thus-configured handle member 23 is fixed to the wall of the vehicle interior structure 15 via the clip part 23a. At this time, the planar surface (back surface) of the planar part 23d is disposed so as to face the outer surface of the wall of the vehicle interior structure 15.

At this time, the support arm 23c of the handle member 23 is in a substantially upright state with respect to the planar surface of the planar part 23d (i.e., the outer surface of the vehicle interior structure 15), and the locking projection 23h is locked by the locking claw 23g.

That is, when the locking projection 23h is locked by the locking claw 23g in a state in which the handle member 23 is fixed to the wall of the vehicle interior structure 15, the support arm 23c is maintained in a substantially upright state with respect to the planar surface of the planar part 23d (i.e., the outer surface of the vehicle interior structure 15). This is the normal state of the handle member 23 (the state illustrated in FIG. 3).

If a pulling force in a predetermined direction (arrow X4 direction in FIG. 3) is applied to the grip part 23b while the handle member 23 is in the normal state (the state illustrated in FIG. 3), the support arm 23c, together with the grip part 23b, rotates about the hinge part 23e and tilts with respect to the planar surface of the planar part 23d (i.e., the outer surface of the vehicle interior structure 15). At the same time, the locking projection 23h is disengaged from the locking claw 23g.

The operation of the emergency lid unlocking mechanism in the thus-configured vehicle lid lock device 1 according to this embodiment will be briefly described below with reference to FIGS. 2 to 5.

First, it is assumed that the handle member 23 is in the normal state as illustrated in FIGS. 2 and 3. In this state, a user hooks his/her finger or the like in the grip part 23b of the handle member 23 and pulls the grip part 23b in, for example, the arrow X4 direction in FIGS. 2 and 3.

As a result, the support arm 23c, including the grip part 23b, starts to rotate about the hinge part 23e in the arrow R1 direction illustrated in FIGS. 2, 3, and 4. Along with this, the locking projection 23h also moves in a direction parallel to arrow R1. Then, the locking projection 23h moves along the outer surface of the locking claw 23g. At this time, the beam part 23f is bent in the arrow R2 direction in FIG. 4.

Eventually, the locking projection 23h goes over the locking claw 23g. This way, the locking projection 23h is disengaged from the locking claw 23g. The state illustrated in FIG. 4 is a state immediately before the locking projection 23h is disengaged from the locking claw 23g.

Once the locking projection 23h is completely disengaged from the locking claw 23g, the beam part 23f returns in the arrow R3 direction in FIG. 5 due to its own elastic restoring force, and the deflected state is eliminated.

When the user continues to pull the grip part 23b in the arrow X4 direction, the support arm 23c, including the grip part 23b, tilts in the arrow R1 direction with respect to the planar surface of the planar part 23d. Along with this, the grip part 23b pulls the cable 24 in the arrow X3 direction in FIGS. 2 and 4. As a result, the cable 24 moves in the arrow X3 direction. FIG. 5 illustrates a state in which the support arm 23c, including the grip part 23b, pulled in the arrow X4 direction tilts in the arrow R1 direction with respect to the planar surface of the planar part 23d, pulling the cable 24 in the arrow X3 direction.

When the cable 24 moves in the arrow X3 direction, the lock pin 22 moves in the arrow X1 direction (retracting direction) in FIG. 2. As a result, the lock pin 22 is disengaged from the part of the lid 10. This allows the lid 10 to be displaced to the open state.

Even if the user stops pulling the grip part 23b of the handle member 23, the state illustrated in FIG. 5 (i.e., the state in which the handle member 23 is tilted) is maintained. Hence, by performing a predetermined opening operation on the lid 10 at this time, the lid 10 can be opened. Examples of the predetermined opening operation to be performed on the lid 10 include pressing the outer surface of the lid 10 with a finger or the like.

As described above, according to the above-described embodiment, in the emergency lid unlocking mechanism of the vehicle lid lock device 1, the handle member 23 is fixed to the vehicle interior structure 15 with the integrally formed clip part 23a. At this time, the handle member 23 is configured to be tiltable with respect to the fixing surface of the vehicle interior structure 15.

In this case, when the locking projection 23h and the locking claw 23g are locked together, the handle member 23 is fixed in a substantially upright state with respect to the fixing surface of the vehicle interior structure 15. When the locking projection 23h and the locking claw 23g are disengaged from each other, the support arm 23c, including the grip part 23b, of the handle member 23 is tiltable with respect to the fixing surface of the vehicle interior structure 15 by the action of the hinge part 23e.

The handle member 23 includes the clip part 23a, the grip part 23b, the support arm 23c, the planar part 23d, the hinge part 23e, the beam part 23f, the locking claw 23g, and the locking projection 23h, which are formed as a single component.

With this structure, the vehicle lid lock device 1 according to this embodiment allows a user to easily eliminate the closed state of the lid 10 only by performing a simple operation of pulling the grip part 23b, while reducing the number of components.

Furthermore, because the handle member 23 is fixed to the vehicle interior structure 15 with the integrally formed clip part 23a, the handle member 23 is not removed from the vehicle body when the handle member 23 is used in an emergency or the like. Hence, there is no risk of dropping the handle member 23 when the handle member 23 is operated in an emergency or the like.

By forming the component members constituting the handle member 23 as a single component, the number of components is reduced, contributing to a reduction in the manufacturing cost.

The disclosure is not limited to the above-described embodiments, and various modifications and applications can be made without departing from the scope of the disclosure. Furthermore, the above-described embodiments include disclosures at various stages, and various disclosures can be extracted by appropriately combining multiple disclosed components. For example, even if some components are deleted from all the components illustrated in one embodiment, if the problem to be solved by the disclosure can be solved and the advantages of the disclosure can be obtained, the structure from which the components have been deleted can be extracted as the disclosure. Furthermore, components in different embodiments may be appropriately combined. The disclosure is not to be restricted by its particular embodiments except as it may be limited by the appended claims.

According to the disclosure, it is possible to provide a vehicle lid lock device having an emergency lid unlocking mechanism that has good operability and enables reliable operation with a small number of components and a simple structure, and that can contribute to cost reduction.

The invention claimed is:

1. A vehicle lid lock device comprising:
   a drive actuator;
   a lock pin provided so as to be movable between a first position where one end of the lock pin is engaged with a part of a lid provided in a vehicle exterior panel to maintain a closed state of the lid and a second position where the lock pin that has received a driving force from the drive actuator and retracted in an axial direction is disengaged from the part of the lid to allow the lid to be in an open state;

a handle member to be gripped by a user, the handle member comprising a hinge portion; and a cable having one end coupled to another end of the lock pin and another end coupled to a part of the handle member and configured to retract the lock pin in the axial direction to disengage the lock pin from the part of the lid member when the user pulls the handle member, wherein a clip part, via which the handle member is fixed to a vehicle interior structure, is formed integrally with the handle member, the handle member is tiltable, by the action of the hinge portion, with respect to a fixing surface of the vehicle interior structure when the handle member is fixed to the vehicle interior structure via the clip part, and the handle member is configured to disengage the lock pin from the part of the lid member by tilting with respect to the fixing surface of the vehicle interior structure.

2. The vehicle lid lock device according to claim 1, wherein the handle member is fixed to the vehicle interior structure by snap-fitting, in which the clip part is fitted into a fitting hole formed in the vehicle interior structure.

3. The vehicle lid lock device according to claim 1, wherein the handle member comprises:

a grip part to be gripped by the user and to a part of an outer circumferential surface of which the another end of the cable is coupled;

a support arm extending outward from a part of the outer circumferential surface of the grip part and provided with a locking projection at a portion of a distal-side periphery of the support arm;

a planar part from one planar surface of which the clip part projects outward;

a portion of a periphery of the planar part and another portion of the support arm on an opposite side of a longitudinal axis of the support arm from a position where the locking projection is formed, at the distal-side periphery of the support arm; and a locking claw formed at a distal end of a beam part extending from another surface of the planar part in a direction opposite to the direction in which the clip part protrudes, at the periphery of the planar part, the locking claw being configured to be engageable with and disengageable from the locking projection, and in the handle member, when the locking projection is locked by the locking claw, the support arm is maintained in an upright state with respect to the planar surface of the planar part, and when a pulling force in a predetermined direction is applied to the grip part, the locking projection and the locking claw are disengaged from each other, allowing the support arm, together with the grip part, to rotate about the hinge part and tilt with respect to the planar surface of the planar part.

4. The vehicle lid lock device according to claim 3, wherein the hinge part has a self-hinge structure in which the support arm and the planar part are integrally formed.

5. The vehicle lid lock device according to claim 3, wherein the hinge part is disposed on the opposite side of a central axis of the handle member from the side on which the cable is disposed, and the beam part, the locking claw, and the locking projection are disposed on the same side of the central axis as the cable.

6. The vehicle lid lock device according to claim 1, wherein the handle member is provided near an opening formed in a partition provided in a luggage room, and the opening is provided with a removable lid that covers the handle member.

7. The vehicle lid lock device according to claim 3, wherein the grip part has a substantially ring shape having an inside diameter that allows a user to insert a finger therethrough for operation.

8. The vehicle lid lock device according to claim 1, wherein the handle member is formed as a single component of a synthetic resin material.

9. The vehicle lid lock device according to claim 1, wherein the handle member is fixed to the vehicle interior structure with the integrally-formed clip part such that the handle member is not removable from the vehicle body when the handle member is used in an emergency.

* * * * *